United States Patent [19]
Leino et al.

[11] Patent Number: 5,987,252
[45] Date of Patent: Nov. 16, 1999

[54] METHOD AND APPARATUS FOR STATICALLY ANALYZING A COMPUTER PROGRAM FOR DATA DEPENDENCIES

[75] Inventors: K. Rustan M. Leino, Sunnyvale; Mark David Lillibridge, Mountain View; Raymond Paul Stata, Palo Alto, all of Calif.

[73] Assignee: Digital Equipment Corporation, Maynard, Mass.

[21] Appl. No.: 08/932,575

[22] Filed: Sep. 19, 1997

[51] Int. Cl.⁶ .................................................. G06F 9/45
[52] U.S. Cl. .......................................................... 395/704
[58] Field of Search .................................. 395/704, 708, 395/375; 364/200

[56] References Cited

U.S. PATENT DOCUMENTS

| | | | |
|---|---|---|---|
| 4,814,978 | 3/1989 | Dennis ...................................... | 364/200 |
| 5,329,626 | 7/1994 | Klein et al. .............................. | 395/375 |
| 5,513,350 | 4/1996 | Griffin et al. ............................ | 395/600 |
| 5,680,552 | 10/1997 | Netravali et al. ........................ | 395/200 |
| 5,754,861 | 5/1998 | Kumar ...................................... | 395/704 |
| 5,787,287 | 6/1998 | Bharadwaj ................................ | 395/708 |

OTHER PUBLICATIONS

Banatre et al., "Compile–time detection of information flow in sequential programs," 3rd European Symposium on Research in Computer Security (ESORICS), Brighton, UK, Nov. 1994.

Denning et al., "Certification of Programs for Secure Information Flow," ACM Jul. 1977, vol. 20, No. 7, *Operating Systems*, R. S. Gaines Editor, pp. 504–513.

Dijkstra, E.W., "States and Their Characterization," *A Discipline of Programming*, Prentice–Hall 1976, Chapter 2, pp. 10–37.

Harel, D., "First–Order Dynamic Logic," *Lecture Notes in Computer Science*, Editor: Goos et al, Springer–Verlag, 1979, pp. 7–2.3.

Hoare, C.A.R., "An Axiomatic Basis for Computer Programming," Communications of the ACM, vol. 12, No. 10, Oct. 1969.

Hoare, C.A.R., "Proof of correctness of data representations," Acta Informatica, 1(4), 271–81, Springer–Verlag GmbH 1972.

Hoare, C.A.R., "An axiomatic basis for computer programming," Comm. ACM 12(10), 576–80, 583, Oct. 1969.

Kozen et al., "Logics of Programs," *Handbook of Theoretical Computer Science*, Editor: J. van Leeuwen, Elsevier Science Publishers B.V., 1990.

Lampson, B.W., "A Note on the Confinement Problem," Comm. Of the ACM Oct. 1971, vol. 16, No. 10, *Operating Systems*, Editor: C. Weissman, 1973.

Volpano et al., "A Type–Based Approach to Program Security," Proceedings of TAPSOFT '97, Colloquium on Formal Approaches in Software Engineering, Lille France, Apr. 14–18, 1997.

The article "Communicating Sequential Processes" by C.A. Hoare in ACM, Aug. 1978.

The article "An Axiomatic Basis for Computer Programming" by C.A.R. Hoare, in ACM, Oct. 1969.

*Primary Examiner*—Tariq R. Hafiz
*Assistant Examiner*—Chameli C. Das
*Attorney, Agent, or Firm*—Pennie & Edmonds LLP

[57] ABSTRACT

A method and an apparatus analyze a computer program for dependencies of the program output on the program input. To analyze the program, the program is transformed by a function into a Boolean expression called a verification condition. An example of this function is the weakest liberal precondition. The verification condition characterizes a condition between the input and the output of the program that must be satisfied for the output to be independent of the input. A theorem prover evaluates the verification condition to determine whether the output would depend on the input if the program was executed. If the verification condition evaluates to true, then the output is independent of the input; false, then the output depends on the input.

22 Claims, 3 Drawing Sheets

METHOD AND APPARATUS FOR STATICALLY ANALYZING A COMPUTER PROGRAM FOR DATA DEPENDENCIES

FIELD OF THE INVENTION

This invention relates generally to statically analyzing computer programs, and more particularly to determining data dependencies in computer programs.

BACKGROUND

In computer systems, and particularly networked computer systems, it is common for a first computer system to download and execute a program from a second computer system. During its execution, the program might access private data of the first computer. Generally, the first computer might permit the program to read and write such private data. Moreover, the first computer might permit the program to read and send public data back to the second computer. The first computer, however, wants to ensure that the program does not send private data back to the second computer along with the public data. So, the program must have a secure information flow, that is, the behavior of the program must not reveal anything about the private data of the first computer, either by the public data that is returned to the second computer or by not returning the public data at all.

Consequently, the problem of determining whether the information flow of a program is secure has given rise to two general approaches at a solution, type systems and data flow analyses. Type systems associate a type or a security level with each expression and statement in the program. Some statements may not type check: for example an assignment statement "x:=E", which assigns the value of expression E to variable x, type checks only if the type of expression E is less than or equal to the type of variable x (i.e., type(E) ≦type(x)). For a program to be secure, every statement must type check.

The data flow analysis approach analyzes the data flow of a program using standard compiler techniques. For example, the program "v:=v+h; v:=0", where h is a private variable, and v is a public variable, is transformed into another program with a variable vv denoting the set of variables that may contribute to the value of the variable v and with a variable hh denoting the set of variables that may contribute to the value of the variable h. The exemplary program becomes "vv:=vv∪hh; vv:={ }", where "∪" denotes set union and "{ }" denotes the empty set. Standard compiler techniques then infer that the program ends with "vv is { }", which means that the final value of v does not depend upon any other variables, especially not upon the value of h. Hence, the data flow analysis will certify this program.

Both the type system and data flow analyses approaches have been proven sound; that is, these methods do not give false positives. Therefore, a program certified as secure is truly secure. Both approaches, however, are too coarse and reject too many programs that are actually secure, i.e., they produce too many false negatives. Known type systems, for instance, will reject any program with an insecure sub-component and thus produce a false negative. For example, the type system method will incorrectly reject the program "v:=h; v:=0" because of the "v:=h" sub-component, even though the final value of v does not depend on h. The data flow analysis approach will reject some secure programs because the approach does not detect that a particular operator in the program will make the final value of v independent of the value of h. For example, the data flow method will reject the secure program "v:=h; v:=v−h", although the program always terminates with v=0.

Hence, a more fine grained method and apparatus are needed that can properly certify programs with secure information flow that previous implementations reject.

SUMMARY OF THE INVENTION

In accordance to the present invention, an objective is to provide a method and apparatus that can statically analyze a computer program for secure information flow. Another objective is to produce fewer false negatives than previous known implementations: that is, identify a program as insecure when, in fact, the program is secure. A corresponding objective is that the method and apparatus never produce false positives; that is, identify a program as secure when, in fact, the program is not secure.

In terms of the disclosed method, the invention transforms the program into a representation. The representation characterizes a condition between an input and an output of the program that must be satisfied for the output to be independent of the input. The representation is evaluated to determine whether the output would depend on the input if the program was executed.

In one aspect of the method, the representation is a Boolean expression. In another aspect, the steps of the method are statically performed before the computer program executes.

In yet another aspect of the method, the transforming includes applying a function to the computer program to produce the representation. The function that is applied can include the weakest liberal precondition, the weakest conservative precondition, the strongest post-condition, Hoare logic and dynamic logic.

In terms of the disclosed apparatus, the invention comprises a verification condition generator that transforms the program into a representation. The representation characterizes a condition between an input and an output of the program that must be satisfied for the output to be independent of the input. A theorem prover receives the representation from the verification condition generator and evaluates the representation to determine whether the output would depend on the input if the program was executed.

BRIEF DESCRIPTION OF THE DRAWINGS

An embodiment of the invention will be described with reference to the accompanying drawings, in which.

DETAILED DESCRIPTION OF A PREFERRED EMBODIMENT

Figure 1:
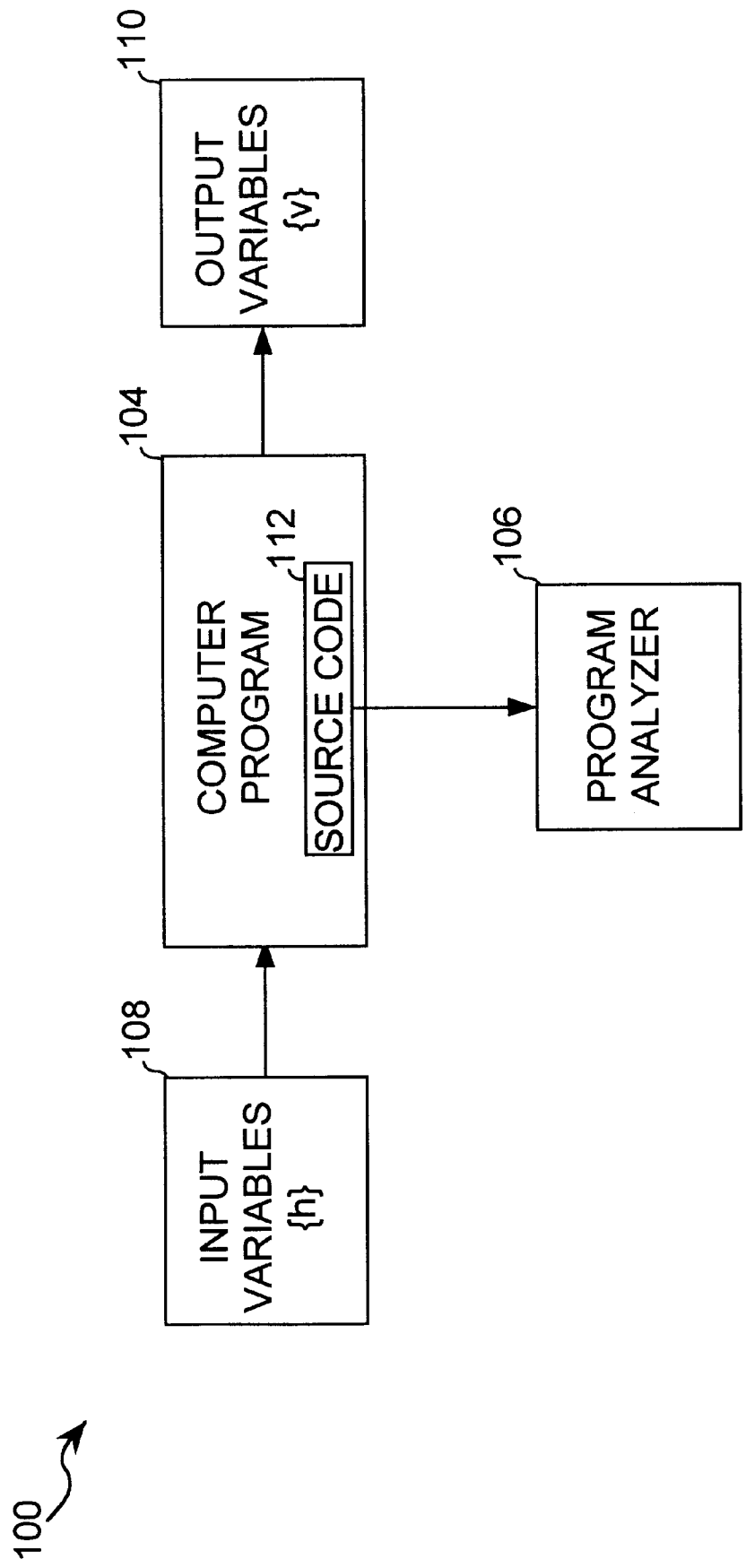
FIG. 1 shows a exemplary flow diagram including a computer program and a program analyzer that can analyze the program according to the principles of the invention.

FIG. 1 shows a flow diagram 100 including a computer program 104 and a program analyzer 106. The computer program 104 receives input data for a set of variables 108, {h}, and produces output data for a set of variables 110, {v}. The program 104 may receive other sets of input variables, in addition to the input variables 108, and produce other sets of output variables, in addition to the output variables 110.

The sets of variables 108, 110 each identify data objects of the computer system 100. For example, each variable in the sets 108, 110 might represent private data of the computer system 100, such as a password, that must be protected from unauthorized discovery. Alternatively, each variable in the sets 108, 110 might represent public data of the computer system 100 such as data files, for example, that can be accessed by other processes or by computer systems over a network.

The program 104 includes program statements (or source code 112) that might operate on the input variables 108 to produce the output variables 110. The source code 112 can be written in any programming language known in the art. If the values of the input variables 108 contribute to the values of the output variables 110, then the output variables 110 are said to depend on the input variables 108. Otherwise, the output variables 110 are independent of the input variables 108.

The program analyzer 106 receives the source code 112 as input and, according to the principles of the invention, statically analyzes the source code 112 to determine whether the output variables 108 would depend on the input variables 110 if the computer program 104 were to be executed. The output variables 108 do not depend on the input variables 110 when the values of the output variables 110 reveal nothing about the values of the input variables 108. In the preferred embodiment, the program analyzer 106 is implemented using software as described below in FIG. 2.

Figure 2:
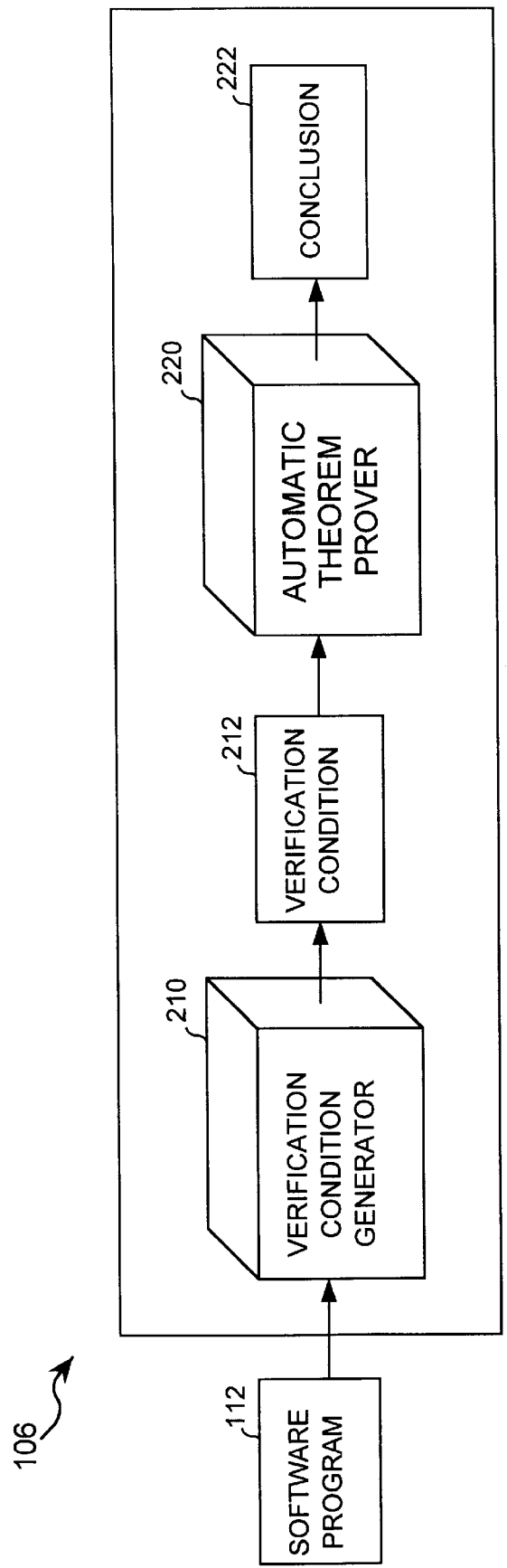
FIG. 2 shows an exemplary flow diagram of the program analyzer.

FIG. 2 shows an exemplary flow diagram of the program analyzer 106. The source code 112 of the program 104 is input to a verification condition generator 210, which transforms the source code 112 into an expression or representation called a verification condition 212. The verification condition 212 is a Boolean expression represented as a string of symbols. The verification condition 212 has a logical value that is either true or false.

To generate the verification condition 212, the verification condition generator 210 uses axiomatic semantics. The semantics characterize the operation of the program 104 in terms of initial states and final states, hereafter respectively called pre-states and post-states. Pre-states represent the values of variables before the program 104 is executed, and post-states represent the values of variables after the program 104 is executed.

The term "predicate" is used for the formal semantic expression used to denote the verification condition 212. A predicate characterizes the set of pre-states and post-states for which the predicate is true. Accordingly, the semantic expression for the verification condition 212 evaluates to true when the program 104 satisfies some particular condition such as, for example, when the program 104 establishes a particular post-state. The verification condition 212 will not be logically true unless the particular post-state is independent of the pre-state. The verification condition 212 will not produce false positives.

In the preferred embodiment, the verification condition generator 210 uses a weakest liberal precondition (wlp) predicate to transform the source code 112 into the verification condition 212. A detailed explanation of the weakest liberal precondition and the semantic characterization of a programming language using wlp is described by Edsger W. Dijkstra in "A Discipline of Programming", pp. 15–36, 1976, incorporated by reference herein. There the concept of wlp is used to prove whether or not a given program established a particular post-condition. Here, the wlp predicate is used for a different purpose: that is, in general, to prove that the output variables 110 produced by a particular program is independent of the input variables 108. This proof is achieved by applying the wlp predicate to each statement of the source code 112 such that the verification condition 212 is generated.

An automatic theorem prover 220 evaluates the verification condition 212 and produces a conclusion 222 indicating that the verification condition 212 is true, false or indeterminate. An indeterminate conclusion 222 may result when the theorem prover 220 is unable to prove that the verification condition 212 is either true or false. The invention can be practiced using any standard theorem prover, automatic, semi-automatic, or interactive, but the effectiveness of the invention can depend upon the ability of the theorem prover 220 to arrive at a conclusive result, i.e., to determine that the condition 212 is either true or false.

When the theorem prover 220 determines the verification condition 212 is true, then the output variables 110 are independent of the input variables 108; i.e., the values of the output variables 110 reveal nothing about the values of the input variables 108. Conversely, if the theorem prover 220 determines that the verification condition 212 is false, then the output variables 110 may depend on the input variables 108, i.e., the output variables 110 may reveal information about the values of the input variables 108. If, however, the theorem prover 220 produces an indeterminate conclusion 222, then the actual dependencies of the output variables 110 on the input variables 108 are unknown.

Below, the principles of the invention are described using the function wlp. The invention, however, can be practiced using alternative functions for transforming program source code 112 into a verification condition 212. These alternative predicates include Hoare logic, dynamic logic, the strongest post-condition (sp), and the weakest conservative precondition (wp). Hoare logic is described by C. A. R. Hoare in "An Axiomatic Basis for Computer Programming", CACM Vol. 12, No. 6, pp. 576–583, October 1969, incorporated by reference herein. Dynamic Logic is described further by David Harel in "First-Order Dynamic Logic", Lecture Notes in Computer Science, Volume 68, Springer-Verlag, 1979. The semantic characterization of the source code 112 using such predicates is known to those of ordinary skill in the art.

In the following description, the program 104 is more generally referred to as program S. With respect to the wlp, the wlp of a program S characterizes those pre-states from which every terminating execution of S leads to a post-state that satisfies R, where R is a collection of post-states of the program S. The predicate wlp.S.R expresses this characterization, where a left-associative, infix dot denotes the application of the function.

DETERMINISTIC PROGRAMS

To apply the wlp predicate to a deterministic program, the input variables $\{h\}$ 108, the output variable $\{v\}$ 110 and an auxiliary variable K are considered. For a deterministic program S, there is at most one terminating execution of the program S from any given pre-state. In other words, each execution of the program S from an identical pre-state produces an identical post-state. K is a program variable that is not modified when the program S executes. Using K to impose a post-state upon program S, the predicate wlp.S.R becomes wlp.S. (v=K), which characterizes the pre-states of S from which all terminating executions of S terminate in a post-state where the value of the output variable v is equal to K.

Accordingly, for the value of output variable v to be independent of the input variable h, the predicate wlp.S.

(v=K) needs to be independent of h. The property that a predicate P is independent of a variable h can be expressed as $$P = <\forall h::P>$$

where the free occurrences of h in the rightmost P are bound within the formula $<\forall h::P>$. An equivalent expression is $P = <\exists h::P>$. If P holds true for some pre-states, then P also holds true for all values assigned to the input variable h, implying that the predicate P is independent from the input variable h.

Substituting the predicate wlp.S.(v=K) for P, the independence of the deterministic program S from h can be expressed by the verification condition $$wlp.S.(v=K) \equiv <\forall h::wlp.S.(v=K)>.$$

To produce the verification condition 212, the verification condition generator 210 operates using standard compiler principles. The source code 112 is parsed, statement by statement to produce, for example, a parse tree representing the program 104. The predicate wlp is applied to each statement of the program 104.

The following examples demonstrate the application of the predicate wlp on exemplary source code 112 to produce the verification condition 212 and to determine whether the output variable v depends upon the input variable h. A first example calculates the wlp of the following program $S_1$ for the post-state v=K.

{This is $S_1$}
if h then
   v:=true
else
   v=false
end
This yields $$(h \Rightarrow (v = K)[v := true]) \land (\neg h \Rightarrow (v = K)[v := false]).$$

Applying substitution, this simplifies to $$(h \Rightarrow true = K) \land (\neg h \Rightarrow false = K),$$

which in turn simplifies to
   h=K.
The verification condition for the program is expressed as $$h = K \Rightarrow \langle \forall h :: h = K \rangle,$$

which evaluates as false. Thus, the program analyzer 106 would determine that the final value of output variable v depends on the input variable h.

A second example calculates the wlp of the following program $S_2$ for the post-state v=K. This example demonstrates a capability that distinguishes the present invention over type systems; that is, the invention takes into account that the previous contents of a variable are overwritten when a new value is assigned to that variable.

{This is $S_2$.}

$$v:=v+h; v:=0$$

This yields $$(v = K)[v:=0][v:=v+h],$$

which, by applying substitution, first simplifies to $$(0=K)[v:=v+h],$$

which simplifies further to
   0=K.
The corresponding verification condition for the program is therefore expressed as:

$$0=K \rightarrow <\forall h::0=K>,$$

which evaluates to true because 0=K is independent of h. The program analyzer 106 would properly determine that the output variable v is independent of the input variable h, even though at one point in the flow of the program $S_2$, the output variable v depended on the value of input variable h. It was determined that the output variable v was later overwritten and no longer depended on h.

A third example calculates the wlp of the following program $S_3$ for the post-state v=K further illustrating the capability of the invention to properly handle assignment program statements.

{This is $S_3$.}
   h:=v; v:=h
This yields $$(v=K)[v:=h][h:=v],$$

which, by applying substitution, first simplifies to $$(h=K)[h:=v],$$

which simplifies further to
   v=K.
The corresponding verification condition for the program is therefore expressed as:

$$v = K \Rightarrow \langle \forall h :: v = K \rangle,$$

which evaluates to true because h does not occur free in v=K. So, the program analyzer 106 would determine that the final value of output variable v is independent of the input variable h.

A fourth example calculates the wlp of the following program $S_4$ for the post-state v=K. This example demonstrates a capability of the present invention that distinguishes the invention over type systems and data flow analyses techniques; that is, the invention takes into account the semantics of particular operators used in the program.

{This is $S_4$.}

$$v:=h; v:=v-h$$

This yields $$(v=K)[v:=v-h][v:=h],$$

which, by applying substitution, simplifies to $$(v-h=K)[v:=h],$$

which simplifies to $$h-h=K.$$

The corresponding verification condition for the program is therefore expressed as $$h - h = K \Rightarrow \langle \forall h :: h - h = K \rangle,$$

which evaluates to true because h−h=K is independent of the particular value of h. The program analyzer 106 would properly determine that the output variable v is independent of the input variable h, even though at one point in the flow of the program $S_4$, the output variable v depended on the value of input variable h. The program analyzer 106 determined that the dependence on h was later undone by the subtraction operator.

A fifth example calculates the wlp of the following program $S_5$ for the post-state v=K.
{This is $S_5$}
if h<0 then v:=0; h:=h−1 else v:=0; h:=h+1 end
This yields $$(h < 0 \Rightarrow (v = K)[h := h - 1][v := 0]) \land$$
$$(0 \le h \Rightarrow (v = K)[h := h + 1][v := 0]),$$

Applying substitution, this simplifies to $$(h < 0 \Rightarrow 0 = K) \land (0 \le h \Rightarrow 0 = K),$$

which in turn simplifies to
0=K.
The verification condition for the program $S_5$ is expressed as $$0 = K \Rightarrow \langle \forall h :: 0 = K \rangle,$$

which evaluates to true because 0=K is independent of h. Thus, the program analyzer 106 would determine that the output variable v is independent of the input variable h.

NON-DETERMINISTIC PROGRAMS

For a non-deterministic program, execution of the program in a given pre-state will give rise to one of a class of possible post-states. Notably, no known implementations that analyze programs for data dependencies apply to non-deterministic programs. As an advantage, the principles of the present invention can be applied to non-deterministic programs. The verification condition used for deterministic programs, $$wlp.S.(v=K) \equiv <\forall h::wlp.S.(v=K)>,$$

does not work, however, for a non-deterministic program S. A different verification condition is needed. Accordingly, the following exemplary verification condition can be used to guarantee that the output variable v is independent of the input variable h for a non-deterministic program S:

$$wlp.S.(v \ne K) \equiv <\forall h:: wlp.S.(v \ne K)>.$$

VERIFICATION CONDITION GENERATOR AND THEOREM PROVER TRADE-OFF

A limitation of the present invention is that the verification condition generator 210 may be unable to generate a verification condition 212 for certain program constructs and certain operators in the source code 112. Generally, the wlp for typical program statements is well known in the art. For some constructs and operators, however, the wlp may be difficult to compute. A loop statement is an example of such a construct. For a loop statement, deriving the wlp requires knowing the strongest invariant of the loop statement. Using a second-order formula could make the generation of the wlp easier, but would produce a more difficult expression for the theorem prover 220 to analyze.

SELECTIVE TERMINATION

Conceivably, the output variable v of a program can communicate properties of the input variable h if the program can sometimes loop indefinitely rather than terminate. Then whether or not the program S terminates may reveal information about the value of variable h, an indirect data flow that is referred to as selective termination.

For example, the deterministic program $S_6$, if h=0 then loop else v:=0 end, loops if h=0 and terminates with v=0 if h≠0. The termination of the program $S_6$ reveals information about h, i.e., that h≠0. Even the failure of program $S_6$ to terminate can reveal information about the input variable h, i.e., that h=0, if the failure of termination can be detected.

For a deterministic program S, the verification condition $$wlp.S.(v \ne K) \equiv <\forall h::wlp.S.(v \ne K)>$$

can be used to guarantee that the output variable v does not reveal information about the input variable h even in the presence of selective termination. For a non-deterministic program S, however, the verification condition $$wlp.S.(v \ne K) \equiv <\forall h::wlp.S.(v \ne K)>$$

does not suffice to establish whether or not the program S communicates any information about variable h via selective termination.

For example, the non-deterministic program $S_7$, if h=0 then loop else v:=0 end ⟦v::=0, non-deterministically chooses between the if statement and the assignment to output variable v. If h=0, then the program $S_7$ may either loop or terminate with v=0, depending on whether the if statement or the assignment statement will be chosen non-deterministically. If h≠0, then the program $S_7$ terminates with v=0 regardless of whether the if statement or the assignment statement was chosen. Non-termination of the program $S_7$ reveals that the input variable h=0, if the non-termination can be detected.

If, in addition to the verification condition above, the following verification condition is generated using the weakest conservative precondition (wp), $$wp.S.\text{true} \equiv <\forall h::wp.S.\text{true}>,$$

then it can be guaranteed that the output variable v does not reveal information about the input variable h, even in the presence of selective termination.

The following example illustrates this partial correctness by calculating the wlp for the above non-deterministic program $S_7$ using the verification condition above with the post-state v≠K:

$$wlp.(\text{if } h=0 \text{ then loop else } v:=0 \text{ end } \⟦ v:=0).(v \ne K)$$

Calculating the wlp of "⟦", this simplifies to $$wlp.(\text{if } h=0 \text{ then loop else } v:=0 \text{ end}).(v \ne K) \land$$

$wlp.(v:=0).(v \neq K)$.

Calculating the wlp of "if" and ":=", this simplifies to $(h = 0 \Rightarrow wlp.loop.(v \neq K)) \wedge$ $(h \neq 0 \Rightarrow wlp.(v := 0).(v \neq K)) \wedge$ $0 \neq K$.

Calculating the wlp of "loop" and ":=", this simplifies to $(h = 0 \Rightarrow true) \wedge (h \neq 0 \Rightarrow 0 \neq K) \wedge 0 \neq K$ Using predicate calculus, this simplifies to $0 \neq K$.

Because $0 \neq K$ is independent of h, the non-deterministic program $S_7$ satisfies the exemplary verification condition for terminating executions of the program $S_7$. Whether or not the program $S_7$ terminates, however, does depend on the value of the input variable h. Therefore, a guarantee is also needed that whether or not the program $S_7$ terminates is not dependent on the value of h.

As described above, the weakest conservative precondition (wp) can be used to provide this guarantee. The predicate wp.S.true characterizes those pre-states from which the non-deterministic program S terminates. True is a predicate that holds in every state. The verification condition that implies whether or not the program S terminates is independent of h is:

wp.S.true≡<∀h::wp.S.true>.

The verification conditions $wp.S.true \equiv <\forall h::wp.S.true>$ and $wlp.S.(v \neq K) \equiv <\forall h::wlp.S.(v \neq K)>$ are then both used to guarantee that the output variable v does not reveal information about the input variable h for a non-deterministic program S, including revealing information about h via selective termination.

The following example illustrates how the predicate wp.S.true is applied to the above non-deterministic program $S_7$, if h=0 then loop else v:=0 end ⫿ v:=0.

Applying the wp to the program $S_7$ and true becomes $wp.(\text{if } h=0 \text{ then loop else } v:=0 \text{ end } \sqcap v:=0).true$ Calculating the wp of "⫿", this simplifies to $wp.(\text{if } h=0 \text{ then loop else } v:=0 \text{ end}).true \wedge$ $wp.(v:=0).true$.

Calculating the wp of "if" and ":=", this simplifies to $(h = 0 \Rightarrow wp.loop.true) \wedge$ $(h \neq 0 \Rightarrow wp.(v := 0).true) \wedge$ true.

Calculating the wp of "loop" and ":=", this simplifies to $(h = 0 \Rightarrow false) \wedge$ $(h \neq 0 \Rightarrow true) \wedge$ true.

This, in turn, simplifies to $h \neq 0$.

The verification condition for the non-deterministic program $S_7$ is expressed as $h \neq 0 \equiv <\forall h::h \neq 0>$, which does not simplify to the predicate true. Therefore, the output variable v is not independent of the input variable h, i.e., the output variable v reveals information about the input variable h for this non-deterministic program $S_7$ in the presence of selective termination.

CHECKING FOR SECURE INFORMATION FLOW

Figure 3:
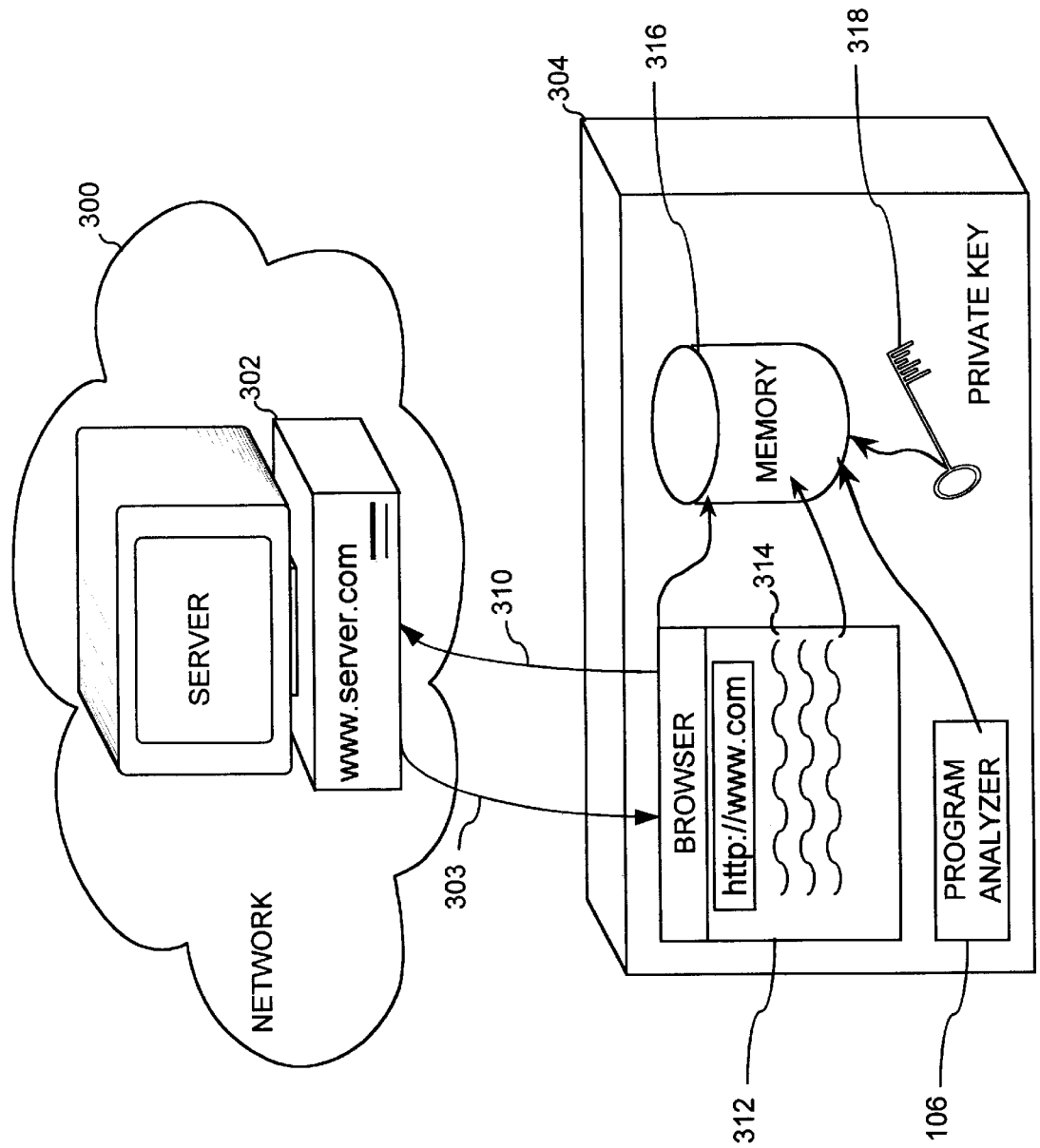
FIG. 3 shows an exemplary communication network that can use the principles of the invention to analyze a downloaded applet for secure information flow.

FIG. 3 illustrates an exemplary application of the principles of the present invention for determining whether a program has secure information flow. Secure information flow means that the output variables 110 would not reveal any information about a certain set of input variables 108 if the program was executed; i.e., that the final values of the output variables 110 are independent of the input variables 108. This is of particular importance when the certain set of input variables 108 holds private data, and the set of output variables 110 hold public data. Clearly, computer programs that produce public outputs that will compromise the private data should not be run.

In many instances, however, there is no way to know beforehand whether the output variables 110 actually depend on the certain set of input variables 108. For example, the program may have been downloaded from another computer in a communication network. Using the present invention, the dependencies can be statically determined before the program 104 is executed.

For example, in FIG. 3 a communication network 300 connects a server 302 in the network 300 with a client computer 304 by network links 308, 310. An example of such a network 300 is the Internet. The server 302 supports a web page; that is, the server 302 maintains documents, pages and other forms of data for retrieval. Small programs, called applets, might be attached to the web page when the web page is retrieved.

The client 306 includes memory 316 for storing a browser 312, the program analyzer 106, public data 314 and private data 318. The memory 316 can include a hard disk and main memory. The browser 312 provides a user of the client 306 with an interface that simplifies access to the server 302. Examples of browser are Netscape Communicator™ and Microsoft Internet Explorer™. For example, the public data 314 may be the type and version number of the browser 312, and the private data 318 may be files and directories of the client 306.

During an execution of the browser 312, the client 306 can request access to the web page on the server 302. The browser 312 issues the request to the server by the link 310. In response to the request, the server 302 returns the data associated with the requested web page by the link 308. Although shown as distinct communication channels, the link 308 and the link 310 can use the same network path.

When the retrieved web page is accompanied by an attached applet, the server 302 sends the source code of the applet to the client 306.

If the attached applet were to be executed, then the applet, for example, might use the public data 314 and the private data 318 as inputs, modify the public data 314 and private data 318, and attempt to return public data 314 and private data 318 back to the server 302. In general, the client 306 could prevent the applet from passing private data 318 to the server 302 because any attempt to transmit the private data 318 would be overt and, thus, readily detected. The private data 318 could be compromised, however, if information about the private data 318 is buried within the returned public data 314, i.e., the returned public data 314 depended upon the private data 318. The client 306, therefore, wants to ensure that when the applet sends public data 314 back to the server 302, that the public data 314 is independent of the private data 318.

Consequently, before the browser 312 executes the retrieved applet, the program analyzer 106 first statically checks the applet for secure information flow according to the principles of the invention. The program analyzer 106 transforms the source code of the applet into a verification condition and evaluates the verification condition to determine whether the output variables 110 produced by the applet, which in this example are associated with the returned public data 314, depend upon the certain variables 108 that are input to the applet, which are the private data 318.

If the program analyzer 106 deduces that the verification condition is true, then the applet is secure; the applet is accepted, and the browser 312 may then execute the applet. If the verification condition proves false, then the applet is not secure; the applet is rejected, and the browser 312 will not execute the applet. If, however, the program analyzer 106 cannot prove conclusively that the verification condition is either true or false, then the actual security of the applet is unknown; the prudent decision is to reject the applet.

That the program analyzer 106 checks the applet statically before executing the applet distinguishes the present invention from known techniques that dynamically check the applet as the applet executes or is being interpreted. Although the above description of the preferred embodiment is described within the context of the Internet and web browsers, the invention can be practiced within any other context where programs are checked for secure information flow.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

What is claimed is:

1. A computerized method for providing secure information flow in a computer system by analyzing a computer program for data dependencies, comprising the steps of:
    generating a representation of the computer program by applying a function for transforming the computer program, the representation including a verification condition indicating a relationship between input data including private data to the computer program and an output of the computer program; and
    evaluating the verification condition using a theorem prover to determine whether the output would depend on the private data if the program were executed; and
    preventing execution of the program when the evaluation produces a predefined failure result.

2. The method of claim 1 wherein the representation is a Boolean expression.

3. The method of claim 1 wherein said steps of generating the representation and evaluating are statically performed before the computer program is executed.

4. The method of claim 1 wherein the output is independent of the private data when the step of evaluating proves that the verification condition to be true.

5. The method of claim 1 wherein the output depends on the private data when the step of evaluating proves that the verification condition is false.

6. The method of claim 1 wherein the verification condition is $$wlp.S.R. \equiv <\forall h::wlp.S.R>$$

where S represents the program, wlp represents a predefined weakest liberal precondition function, h represents the private data, R represents a set of post-states of the program S, and wlp.S.R represents a predicate that is independent of h when the theorem prover proves that the verification condition evaluates to a logical True value.

7. The method of claim 6 wherein the verification condition is a first verification condition,
    the method includes:
        determining whether the program is non-deterministic, and when the program is non-deterministic applying a second, weakest conservative precondition function to the program to generate a second verification condition:

$$wp.S.\text{true} \equiv <\forall h::wp.S.\text{true}>,$$

where wp is the weakest conservative precondition function and wp.S.true represents pre-states of the program from which the program terminates;
        applying a third function to the program to generate a third verification condition:

$$wlp.S.(v \neq K) \equiv <\forall h::wlp.S.(v \neq K)>,$$

where v is a variable represent the output of the program and K is a value not modified by execution of the program;
        evaluating the second and third verification conditions with the theorem prover, and logically combining the evaluation of the second and third verification conditions to determine whether the computer program may reveal information about the private data via selective termination of the program based on the private data.

8. The method of claim 6, wherein the verification condition is a first verification condition,
    the method includes determining whether the program is non-deterministic, and when the program is non-deterministic applying a second, weakest conservative precondition to the program to generate a second verification condition, evaluating the second verification condition with the theorem prover, and logically combining the evaluation of the first and second verification conditions to determine whether the output of the computer program may depend on the private data.

9. The method of claim 6, wherein the verification condition is a first verification condition; and
    representing the computer program as S,
    representing the output as a variable v,
    representing the input as a variable h, representing a variable that would be unchanged by an execution of the program as a variable K, and using a formula]

the method includes:

applying a second function to the program to generate a second verification condition:

$$wlp.S.(v \neq K) \equiv <\forall h::wlp.S.(v \neq K)>,$$

where v is a variable represent the output of the program and K is a value not modified by execution of the program;

evaluating the second verification condition with the theorem prover to determine whether the computer program may reveal information about the private data via selective termination of the program based on the private data; and combining the evaluations of the first and second verification conditions to determine whether to prevent execution of the program.

10. The method of claim 1 further including the step of:

executing the computer program if said step of evaluating indicates that the output does not depend on the private data.

11. The method of claim 1 wherein the applied function is a weakest liberal precondition.

12. The method of claim 1 wherein the verification condition is a first verification condition, the method includes determining whether the program is non-deterministic, and when the program is non-deterministic applying a second, weakest conservative precondition to the program to generate a second verification condition, evaluating the second verification condition with the theorem prover, and logically combining the evaluation of the first and second verification conditions to determine whether the output of the computer program may depend on the private data.

13. The method of claim 1 wherein the applied function uses Hoare logic.

14. The method of claim 1 wherein the applied function is a strongest post-condition.

15. The method of claim 1 wherein the applied function uses dynamic logic.

16. The computerized method of claim 1, wherein the private data is on a local computer, and said steps of generating the representation and evaluating the verification condition are performed on the local computer; and further comprising the steps of:

receiving the computer program from a remote computer; and executing the computer program when the evaluating step determines that the output of the computer program does not depend on the private data.

17. An apparatus for analyzing a computer program for data dependencies to preserve secure information flow, comprising:

means for generating a representation of the computer program by applying a function for transforming the computer program, the representation including a verification condition indicating a relationship between input data including private data to the computer program and an output of the computer program;

means for evaluating the verification condition using a theorem prover to determine whether the output would depend on the private data if the program were executed;

means for preventing execution of the program when the evaluation means produces a failure result.

18. A computer program product for analyzing a computer program for data dependencies to preserve secure information flow, the computer program product for use in conjunction with a computer system, the computer program product comprising a computer readable storage medium and a computer program mechanism embedded therein, the computer program mechanism comprising:

a verification condition generator that generates a representation of the computer program by applying a function for transforming the computer program, the representation including a verification condition indicating a relationship between input data including private data to the computer program and an output of the computer program;

a theorem prover receiving the verification condition from the verification condition generator and evaluating the verification condition to determine whether the output would depend on the private data if the program were executed; and instructions for preventing evaluation of the program when the theorem prover produces a failure result.

19. The computer program product of claim 18 wherein the verification condition is a first verification condition;

the verification condition generator includes instructions for determining whether the program is non-deterministic, and when the program is non-deterministic applying a second, weakest conservative precondition to the program to generate a second verification condition;

the theorem prover includes instructions for evaluating the second verification condition; and the computer program product includes instructions for and logically combining the evaluation of the first and second verification conditions to determine whether the output of the computer program may depend on the private data.

20. The computer program product of claim 18 wherein the verification condition is $$wlp.S.R \equiv <\forall h::wlp.S.R>$$

where S represents the program, wlp represents a predefined weakest liberal precondition function, h represents the private data, R represents a set of post-states of the program S, and wlp.S.R represents a predicate that is independent of h when the theorem prover proves that the verification condition evaluates to a logical True value.

21. The computer program product of claim 20 wherein the verification condition is a first verification condition;

the verification condition generator includes instructions for determining whether the program is non-deterministic, and when the program is non-deterministic applying a second, weakest conservative precondition function to the program to generate a second verification condition:

$$wp.S.true \equiv <\forall h::wp.S.true>,$$

where wp is the weakest conservative precondition function and wp.S.true represents pre-states of the program from which the program terminates; and applying a third function to the program to generate a third verification condition:

$$wlp.S.(v \neq K) \equiv <\forall h::wlp.S.(v \neq K)>,$$

where v is a variable represent the output of the program and K is a value not modified by execution of the program; and the theorem prover includes instructions for evaluating the second and third verification conditions with the theorem prover; and the computer program product includes instructions for logically combining the evaluation of the second and third verification conditions to determine whether the computer program may reveal information about the private data via selective termination of the program based on the private data.

22. The computer program product of claim 20 wherein the verification condition is a first verification condition;

the verification condition generator includes instructions for applying a second function to the program to generate a second verification condition:

$$wlp.S.(v \neq K) \equiv <\forall h::wlp.S.(v \neq K)>,$$

where v is a variable represent the output of the program and K is a value not modified by execution of the program;

the theorem prover includes instructions for evaluating the second verification condition to determine whether the computer program may reveal information about the private data via selective termination of the program based on the private data; and the computer program product includes instructions for combining the evaluations of the first and second verification conditions to determine whether to prevent execution of the program.

\* \* \* \* \*